(12) United States Patent
Fleming

(10) Patent No.: US 6,450,222 B1
(45) Date of Patent: Sep. 17, 2002

(54) NON-PNEUMATIC TIRE HAVING AN ELASTOMERIC HOOP

(76) Inventor: Roger Fleming, 3865 Silverwood Dr., Stow, OH (US) 44262

(*) Notice: Subject to any disclaimer, the term of this patent is extended or adjusted under 35 U.S.C. 154(b) by 0 days.

(21) Appl. No.: 09/353,253

(22) Filed: Jul. 14, 1999

(51) Int. Cl.[7] .............. B60C 1/00; B60C 7/00; B60C 11/00
(52) U.S. Cl. .............. 152/209.5; 152/209.7; 152/302; 152/310; 152/313; 152/323
(58) Field of Search .............. 152/157, 209.5, 152/209.7, 246, 301, 302, 303, 310, 313, 314, 315, 318, 323

(56) References Cited

U.S. PATENT DOCUMENTS

| | | | |
|---|---|---|---|
| 1,424,134 A | * | 7/1922 | Litchfield |
| 1,882,498 A | * | 10/1932 | Jarvis |
| 2,267,403 A | * | 12/1941 | Herold |
| 2,709,471 A | * | 5/1955 | Smith et al. |
| 3,066,716 A | * | 12/1962 | Fishman |
| 3,348,597 A | * | 10/1967 | Goldberg et al. |
| 3,396,773 A | * | 8/1968 | Alderfer |
| 3,853,164 A | * | 12/1974 | Mirtain |
| 4,125,660 A | * | 11/1978 | White et al. |
| 5,176,765 A | * | 1/1993 | Yamaguchi |
| 5,229,047 A | * | 7/1993 | Becker |
| 5,906,836 A | * | 5/1999 | Panaroni et al. |
| 6,036,278 A | * | 3/2000 | Boyer |

FOREIGN PATENT DOCUMENTS

| | | | |
|---|---|---|---|
| DE | 2755111 | * | 6/1979 |
| EP | 715974 | * | 6/1996 |
| FR | 2047520 | * | 12/1971 |
| GB | 2183565 | * | 6/1987 |
| JP | 58-93602 | * | 6/1983 |
| JP | 59-143702 | * | 8/1984 |
| JP | 62-283001 | * | 12/1987 |
| JP | 2-70503 | * | 3/1990 |
| JP | 6-16003 | * | 1/1994 |
| JP | 6-143911 | * | 5/1994 |
| JP | 7-314572 | * | 12/1995 |

OTHER PUBLICATIONS

Abstract for Japan 911.*

* cited by examiner

*Primary Examiner*—Steven D. Maki
(74) *Attorney, Agent, or Firm*—Renner, Kenner, Greive, Bobak, Taylor & Weber

(57) ABSTRACT

A non-pneumatic tire having an elastomeric portion encompassing the tread and a radially inward foam portion. In the elastomeric portion, certain physical characteristics of the elastomeric portion differ between the tread surface and the radially inward region. An increase in the Shore A hardness provides the tire structure with an elastomeric hoop which imparts improved rolling resistance to the tire, without compromising wet/dry traction. Likewise, the weight and compliance of the tire may be adjusted in the foam portion without adverse effects on the rolling resistance. The non-pneumatic tire may be formed from a multi-shot process in a spin cast procedure.

11 Claims, 2 Drawing Sheets

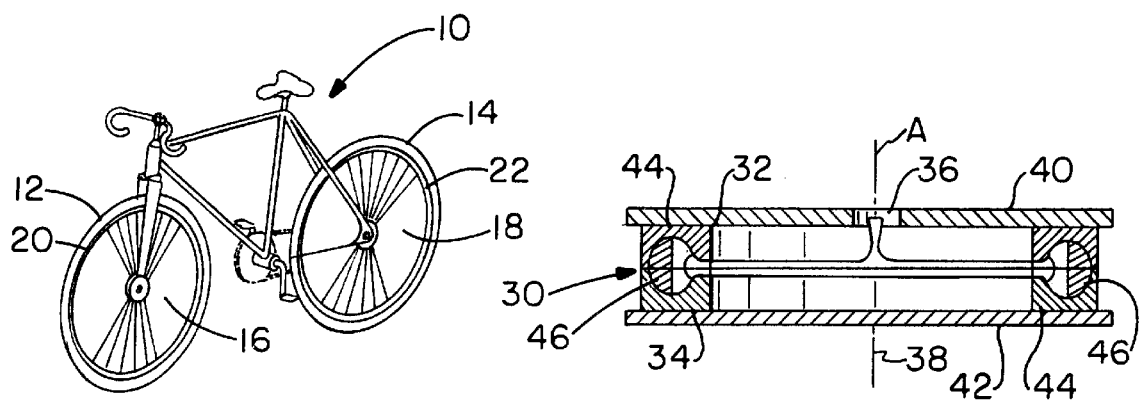
FIG.-1
FIG.-3
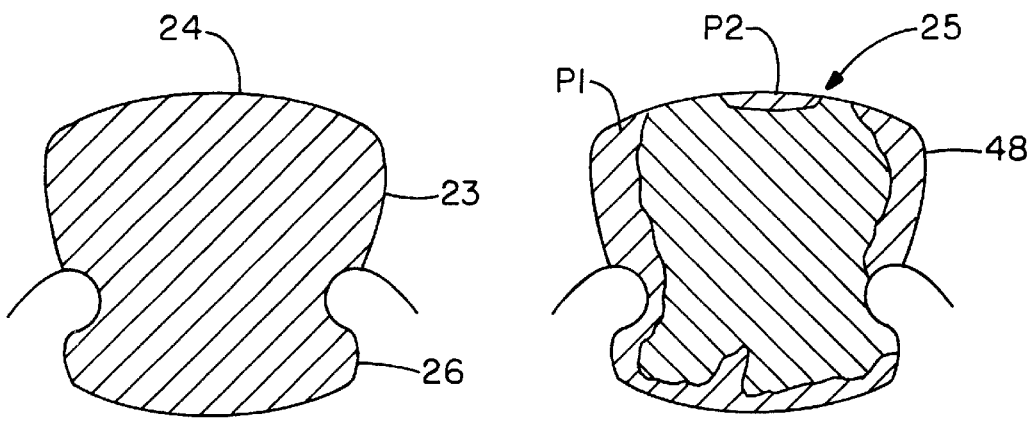
FIG.-2 PRIOR ART
FIG.-4
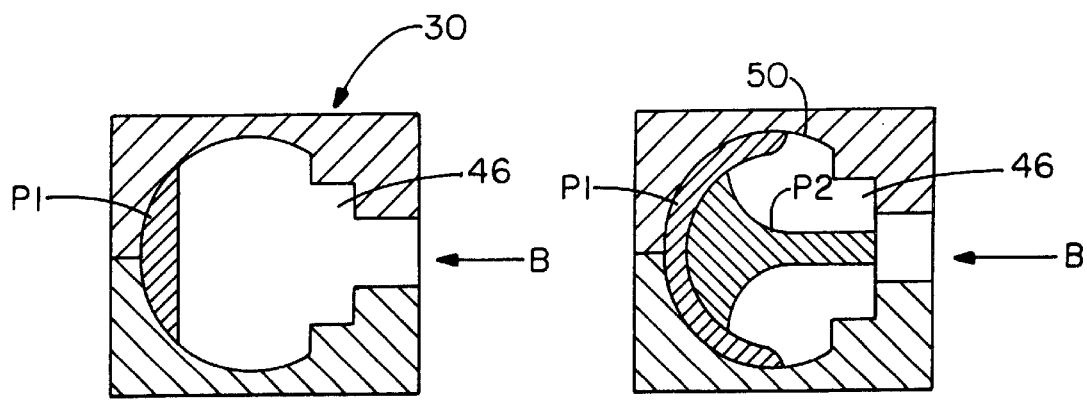
FIG.-5
FIG.-6

NON-PNEUMATIC TIRE HAVING AN ELASTOMERIC HOOP

BACKGROUND OF THE INVENTION

I. Field of the Invention

This invention relates to a non-pneumatic tire and a method for producing a non-pneumatic tire and, more particularly, to a non-pneumatic tire having an elastomeric hoop and a method for producing a non-pneumatic tire formed from at least two different materials and having an elastomeric hoop.

II. Description of the Related Art

A great deal of work has been done to develop a non-pneumatic tire that has the same performance characteristics as a pneumatic tire. Pneumatic tires are geometrically torus shaped and are distinguishable from non-pneumatic tires in that they have a flexible membrane pressure container. This pressure container when filled with air under appropriate pressure allows the tire to meet a variety of performance characteristics. These characteristics include load carrying capacity, rolling resistance, cushioning ability, noise and vibration reduction and road handling ability.

By definition, pneumatic tires contain pressurized air within a hollow chamber. While there have been many improvements to these tires, one of the greatest disadvantages is that of flat tires and blowouts. Therefore, a great deal of research has gone into producing a pneumatic tire having a run-flat capability. Improvements in this area have allowed tire designers to develop pneumatic tires that are able to adequately perform without pressurized air. Typically, this performance permits the tire, while un-inflated, to adequately operate over a certain distance and for a certain time. This eliminates the need to change the tire immediately. Other improvements have dealt with flat tires that seal themselves when a hole or puncture is acquired, such as driving over a sharp object. These designs place a type of liquid material within the tire, that, upon puncture of the tire, flows to the area surrounding the newly formed hole thereby preventing the air from escaping. In all known cases, overcoming flats and/or blowouts in pneumatic tires has come at the expense of performance characteristics.

Non-pneumatic tires eliminate the problem of a flat and/or blowout by eliminating the need for pressurized air. Non-pneumatic tires are typically solid tires or foam tires or a combination thereof, having no hollow chambers therein. Thus, the inherent problems within pneumatic tires discussed above are eliminated. However, many of the performance characteristics found with pneumatic tires have not been duplicated in non-pneumatic tires. In particular, the performance characteristics of cushioning ability, rollability, noise and vibration reductions have not been equaled. Thus, the pneumatic tire is the standard in virtually all passenger tire and wheel applications and, more specifically, automobiles, trucks, vans, bicycles, carts, etc.

Initially, non-pneumatic tires were made of natural rubber. As the technology has developed, various other materials have been used. These other materials have greater performance characteristics than rubber. Most of these materials have come from the polymer industry. For example, bicycle tires have been made of polyurethane foam. As the polymer industry has developed, it has long been desired to replicate the characteristics of a pneumatic tire by using polymers.

The polymer-based tires, such as polyurethane foam, are manufactured by a molding process. The mold is filled with the polyurethane foam, or like material, while under pressure. The pressure "pushes" the foam into the cavital areas of the mold.

A typical method of producing non-pneumatic bicycle tires is known as spin casting. This method involves filling the mold with a pre-blended polymer material while the mold is rotated about its axis. The rotation of the mold produces a centrifugal force effecting movement of the material radially outwardly. The material thus collects in the form of an annulus within the mold. The rotation of the mold continues until the material has gelled sufficiently. The mold is thereafter stopped from rotation and the material is allowed to fully cure.

The known prior art methods of producing a non-pneumatic tire have comprised a single polymer-based tire. Certain polymers may provide distinct advantages in some properties as compared to other polymers. For example, one polymer may exhibit superior vibration and noise characteristics in comparison to another polymer, however, its load-carrying capacity may be inferior. There exists a problem in art to provide a non-pneumatic tire having performance characteristics similar to a pneumatic tire without the disadvantages such as flats and blowouts. Ideally, the improved tire would utilize a variety of polymeric materials in order to maximize the performance.

In the automobile tire industry, it has been found that providing belts within a pneumatic tire structure allows the tire to function as a fixed circumference hoop, meaning that the circumference is the same whatever shape the tire assumes, be it circular, elliptical, or semi-elliptical. The belts provide high planar rigidity which stiffens the tire in order to hold the tread surface flat against the road. In other words, the footprint of the tire is elongated and stabilized.

Heretofore, the belt technology commonly found in the automotive tire industry has not been applied to bicycle tires because of the impracticality of adding belts, for instance steel, to bicycle tires. However, the present invention provides an alternate technology which achieves many of the benefits of a belted tire structure.

The present invention contemplates a new and improved non-pneumatic tire having an elastomeric hoop and a method of manufacturing non-pneumatic tires made of at least two different materials which is simple in design, effective in use, and overcomes the foregoing difficulties and others while providing better and more advantageous overall results.

SUMMARY OF THE INVENTION

In accordance with the present invention, a non-pneumatic tire is provided for attachment to an associated wheel rim. The non-pneumatic tire comprises a first annular portion including a tread surface formed of a first material, and a second annular portion formed of a second material and disposed radially inwardly of the first annular portion.

According to one aspect of the invention, the first material comprises elastomeric material, and the second material comprises foamed material.

According to another aspect of the invention, the first annular portion has a density of 55–65 lb/ft³ and the second annular portion has a density of 20–35 lb/ft³.

According to another aspect of the invention, the second annular portion comprises greater than 60% closed cellular structure.

According to another aspect of the invention, the elastomeric material is a product of a reaction of isocyanate and polyol mixture and the foamed material is a product of a reaction of isocyanate, a polyol mixture, and a blowing agent.

According to another aspect of the invention, the first annular portion includes an outer annular region encompassing the tread surface and an inner annular region. A predetermined physical characteristic of the outer annular region and the inner annular region are different.

According to another aspect of the invention, the predetermined physical characteristic is Shore A hardness. The Shore A hardness of the outer annular region is less than the Shore A hardness of the inner annular region.

According to another aspect of the invention, the Shore A hardness of the outer annular region is 45–65 and the Shore A hardness of the inner annular region is 60–80.

According to another aspect of the invention, the predetermined physical characteristic is tensile modulus. The tensile modulus of the outer annular region is lower than the tensile modulus of the inner annular region.

According to another aspect of the invention, the inner annular region is chemically bonded to the outer annular region at an interface thereof.

According to another aspect of the invention, inner annular region is adhesively bonded to the outer annular region at an interface thereof.

According to another aspect of the invention, the first annular portion further includes an intermediate annular region between the outer and inner annular regions.

According to another aspect of the invention, the hardness of the intermediate region is different than the hardness of the inner annular region.

According to another aspect of the invention, a non-pneumatic tire for attachment to an associated wheel rim is provided. The non-pneumatic tire comprises a first annular portion including a tread surface formed of elastomeric material and including an outer annular region encompassing said tread surface and an inner annular region. The outer annular region exhibits a Shore A hardness of 45–65 and the inner annular region exhibits an Shore A hardness of 60–80. A second annular portion disposed radially inwardly of said first annular portion is formed of foamed material and exhibits a Shore O value of 35–55.

One advantage of the present invention is that the elastomeric material disposed behind the tread region acts as an "elastomeric hoop" to impart favorable ride characteristics to the non-pneumatic tire.

Another advantage of the present invention is that the footprint length, width and rolling resistance of the tire may be controlled by use of the hoop.

Another advantage of the present invention is that the compliance, force transfers characteristics and weight of the non-pneumatic tire may be controlled by the properties of the foamed material.

Another advantage of the present invention is that the presence of more than one hoop allows each hoop to exhibit different hardness characteristics and thereby improve tire performance.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts. A preferred embodiment of these parts will be described in detail in the specification and illustrated in the accompanying drawings, which form a part of this disclosure and wherein:

FIG. 1 is a perspective view of a bicycle;

FIG. 2 is a profile view of a cross-section of a wheel and tire assembly;

FIG. 3 is a cross-section of a typical bicycle tire mold initially filled with a material that has not yet cured;

FIG. 4 is a profile view of a cross-section of another wheel and tire assembly;

FIG. 5 is a cross-sectional view of a tire mold cavity;

FIG. 6 is a cross-sectional view of another tire mold cavity;

DESCRIPTION OF THE PREFERRED EMBODIMENT

Figure 7:
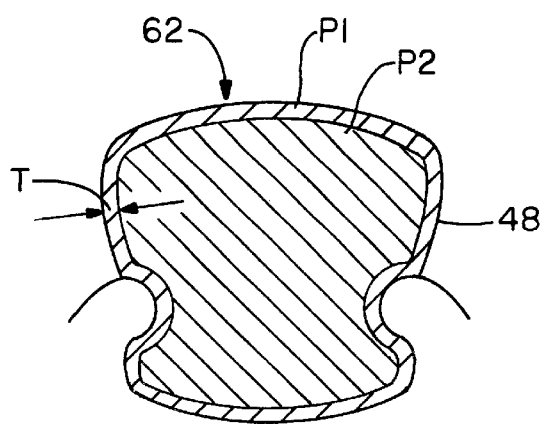
FIG. 7 is a profile view of a cross-section of a wheel and tire assembly.

This invention relates to an inventive non-pneumatic tire structure comprised of more than one material. The process described herein will be used to form a bicycle tire, however, this process can also be used to form a variety of different tires such as for golf carts, lawn mowers, wheelchairs, automobiles and trucks. This process will also work for numerous other material-molded non-tire articles.

The process described herein is referred to generally as a multi-shot process, meaning that two or more materials are injected into a tire mold at spaced time intervals. The process will be described with reference to spin casting the molded tire. However, in producing other molded articles spin casting may not be the preferred method. As such, this invention is not limited to a spin cast method but can also be applied to any other pressure-dependent processes for molding articles.

Referring now to the drawings, which are for purposes of illustrating preferred embodiments of the invention only, and not for purposes of limiting the invention, FIG. 1 shows a typical bicycle 10 having front and rear tires 12, 14. The tires 12, 14 are mounted upon front and rear rims 20, 22 on front and rear wheels 16, 18, respectively. The front and rear tires 12, 14 are non-pneumatic tires and may be solid or may have a non-pressurized chamber produced by the process described below.

FIG. 2 shows a prior art solid non-pneumatic tire 24 mounted upon a rim 26. The tire 24 comprises only one material. Producing such a solid non-pneumatic tire made of one substance is well known within the prior art. Typically, the tire 24 is produced by utilizing a spin cast method.

A typical spin cast procedure will now be described. FIG. 3 shows a typical tire mold 30 used in a spin cast process. The tire mold 30 comprises upper and lower annular halves 32, 34. A liquid material 44 is introduced into an opening 36 located substantially at a center 38 of the tire mold 30. Top and bottom plates 40, 42 hold the upper and lower annular halves 32, 34 together. The plates 40, 42 apply pressure to the annular halves 32, 34 to ensure that the liquid material will not be lost due to leakage from insufficient compression.

The material 44 is introduced through the opening 36 and thereafter flows outwardly to a periphery 50 of the tire mold 30, best shown in FIG. 6. This outward flow occurs because of the centrifugal force caused by the rotation of the tire mold 30 along with the plates 40, 42. This centrifugal force forces the material 44 into the cavity 46. In prior art, solid non-pneumatic tires, the material 44 is introduced in the direction of arrow A until it substantially fills the cavity 46. Then, the introducing of the liquid material 44 is stopped and the tire mold 30 continues to spin. Thus, the material 44 collects at the outermost periphery 50 and fills the entire cavity 46. This process produces a non-pneumatic tire 24 comprising only one material as shown in FIG. 2.

In a preferred embodiment of the invention, a first material $P_1$ is introduced into the spin-cast mold 30. The volume of the first material $P_1$ is insufficient to completely fill cavity 46. After a predetermined time, $T_1$, a second material $P_2$ is thereafter introduced into the spin-cast mold 30. If the volume of the second material $P_2$ is sufficient to fill the remainder of the cavity 46 the process is called a "two-shot process" and will produce a tire having two layers. The materials $P_1$, $P_2$ are chosen for specific properties they impart to the completed tire as will be discussed in further detail below.

In the preferred embodiment, the predetermined time $T_1$ allows the first material $P_1$ to partially cure to a predetermined level of structural integrity before any subsequent material is added to the mold 30. The time $T_1$ permits the first material $P_1$ to develop structural integrity in order to withstand penetration of the second material $P_2$ as it is added. In the preferred embodiment, $T_1$ is insufficient to allow the first material $P_1$ to cure completely.

The second material $P_2$ is introduced into the opening 36 of the annular tire mold 30 in a similar manner as first material $P_1$. The spinning of the tire mold 30 is at a predetermined rate R, that is dependent upon the materials $P_1$, $P_2$ chosen and the type of non-pneumatic tire being formed. The first spinning rate required for the first material $P_1$ is denoted as $R_1$. The second spinning rate required for the second material $P_2$ is denoted as $R_2$. The second spinning $R_2$ can be the same as the first spinning rate $R_1$ or it may be different.

If the second, material $P_2$ is introduced too early (that is, if time $T_1$ is too short) the second material $P_2$ will penetrate the initial elastomer layer formed by the first material $P_1$ thereby leaving streaks of the second material $P_2$ within the first material $P_1$. Introducing the second material $P_2$ too soon may also cause one or both materials $P_1$, $P_2$ to have a non-uniform thickness. FIG. 4 shows a non-pneumatic tire 25 produced by such a process where the second material $P_2$ was introduced before the first material $P_1$ attained the critical curing time $T_1$. In other words, the time $T_1$ was insufficient for the first material $P_1$ to develop the appropriate structural integrity. As shown in FIG. 4, the second material $P_2$ penetrated the first material $P_1$ layer thereby leading to a non-uniform thickness of the first material $P_1$ layer around the periphery 48 of the tire 25. The non-pneumatic tire 25 produced is thus non-uniform and cannot properly take advantage of the properties of the materials $P_1$, $P_2$.

FIG. 5 shows a cross-sectional view of the cavity 46 of the spinning tire mold 30. As the first material $P_1$ is introduced in the direction of arrow B, due to centrifugal forces, the first material $P_1$ collects at the outer periphery of the cavity 46. As the first material $P_1$ begins to cure, a second material $P_2$ is introduced as shown in FIG. 6. At the introduction of material $P_2$, $P_1$ has begun to cure along the outer periphery 50 of the cavity 46 and is in a more stable state than that of $P_2$. Thus, $P_2$ does not penetrate $P_1$ as it is introduced. The second material $P_2$ exhibits a force upon $P_1$. This force of $P_2$ against $P_1$ allows $P_1$ to further elongate and flow further along the outer periphery 48 of the cavity 46 as shown in FIG. 6. Thus, as shown in FIG. 7, $P_1$ forms an outer layer of uniform thickness t along the outer periphery 50 of the cavity 46. Where it is desired to have $P_1$ form an outer layer along the periphery 40 of the tire, the non-pneumatic tire 52 produced will be similar to that as shown in FIG. 7. The thickness t of the material $P_1$ is uniform throughout the cross section of the tire 52. With this process, the thickness t of the layer of first material $P_1$ can be controlled. Thus, where it is desired to have a greater thickness t along the periphery 48 of the tire 52 more of the material $P_1$ would be shot into the mold 30. Additionally, the thickness t is controlled by the spinning rate R, the curing time $T_1$ and the chemical properties of the material chosen.

As noted above, the spinning rate R of the mold is also an important feature of this invention since in a spin cast procedure the spinning produces the pressure against the polymers. Where the second spinning rate $R_2$ of the mold is too great, the material $P_2$ penetrates the elastomer layer $P_1$ producing the unequal distribution of material similar to the tire shown in FIG. 4. Conversely, when the first spinning rate $R_1$ of the mold is too slow the material $P_1$ is unable to flow around the mold 30. A tire produced when the first spinning rate $R_1$ is too slow is shown in FIG. 6. Thus, the bicycle tire 52 shown in FIG. 7 was formed using proper spinning rates $R_1$, $R_2$. For that reason, the tire 52 has a uniform thickness $P_1$ along the outer periphery 48 of the tire 52.

Figure 8:
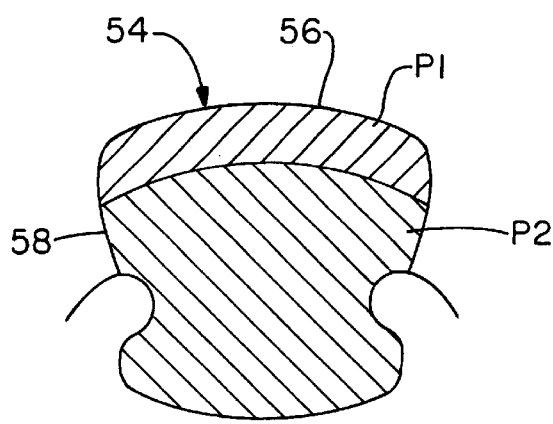
FIG. 8 is a profile view of a cross-section of another wheel and tire assembly.

FIG. 8 shows a bicycle tire 54 where it is desired to use the polyurethane elastomer, or other first material $P_1$, only for the tread region 56. To produce a non-pneumatic tire 56, the material $P_1$ must be dispersed and stable or be highly viscous and/or the first spinning rate $R_1$ of the mold 30 must have been slow enough so that the material $P_1$ does not extend along the sidewalls 58 of the tire 54. The spinning rate R of the mold 30 is also dependent upon the viscosity of the material chosen. Thus, for thicker materials the first spinning rate $R_1$ must be greater than that for a thinner material if it is desirable that the material flows along the sidewalls 58 of the tire 54.

Figure 9:
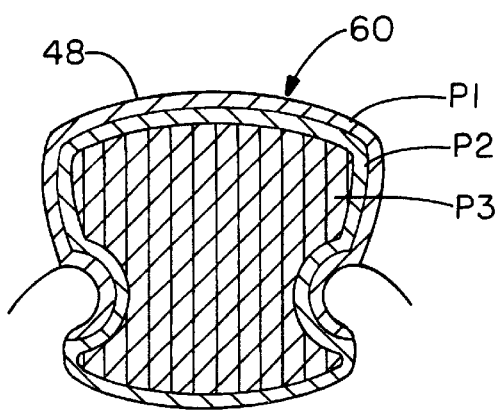
FIG. 9 is a profile view of a cross-section of yet another wheel and tire assembly; and, FIG. 10 is a profile view of a cross-section of still another wheel and tire assembly.
Figure 10:
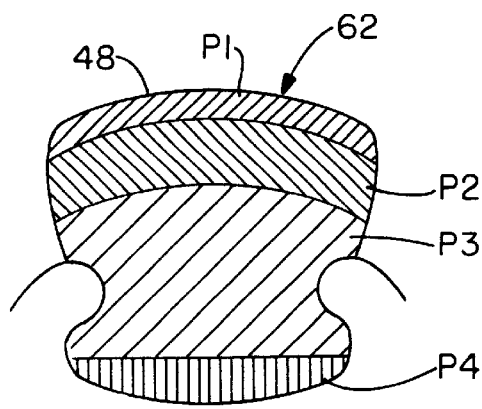

A "multi-shot process" comprises utilizing a number of materials. Different embodiments of non-pneumatic tires formed by a multi-shot process are shown in FIG. 9 and FIG. 10. More specifically, the method comprises following a similar procedure as with the two-shot process described above but having the additional steps of waiting a predetermined second curing time $T_2$ for the second material $P_2$ to cure or partially cure, and thereafter, utilizing a third material $P_3$ different from the previous material $P_2$. Upon waiting the predetermined time $T_2$ for the curing of material $P_2$, the third material $P_3$ is introduced within the tire mold 30. Thereafter, if it is desired a fourth material P4 could also be used. Again, prior to introducing material $P_4$ a predetermined curing time $T_3$ for material $P_3$ must have elapsed. Material $P_4$ will thereafter be introduced. Utilizing four materials in the manner described above could yield the non-pneumatic tire 60 shown in FIG. 10 and would depend upon the preference of the design criteria chosen for the tire 60. The tire 60 shown in FIG. 9 was formed by a process which allowed $P_1$ to extend along a portion of the outer periphery 48 of the tire 60 and is described in further detail below. With reference to FIG. 10, a tire 62 is shown whereby it was preferred to have different thicknesses of each layer of the tire 62.

FIG. 9 shows a non-pneumatic tire 60 that utilized three materials $P_1$, $P_2$, $P_3$. Initially, the mold 30 is spinning and the first material $P_1$ is introduced. In order to achieve the flow of the material $P_1$ around the outer periphery 50 of the mold 30 the spin rate $R_1$ must be great enough to force the flow of the material along the outer periphery 50. The determination of the spin rate $R_1$ lies with the material $P_1$ chosen. Properties such as viscosity, density and flow will greatly determine the spin rate $R_1$. However, the spin rate $R_1$ alone may not satisfy the flow of material $P_1$ around the entire outer circumference of the mold 30. The introduction of the second material $P_2$, after the appropriate curing time $T_1$, will also aid in forcing the material $P_1$ along the outer periphery 50 of the mold 30.

The non-pneumatic tire 62 shown within FIG. 10 utilized four materials $P_1$, $P_2$, $P_3$, and $P_4$. All curing times T for the process used to produce tire 60 are critical similar to the time T for producing the tires shown in FIGS. 7 and 9. The curing time T for the tire 62 shown within FIG. 10 must be long enough to ensure that the material has been dispersed and is stable or highly viscous and thus not allow penetration of the next material being introduced.

Figures 11, 12:
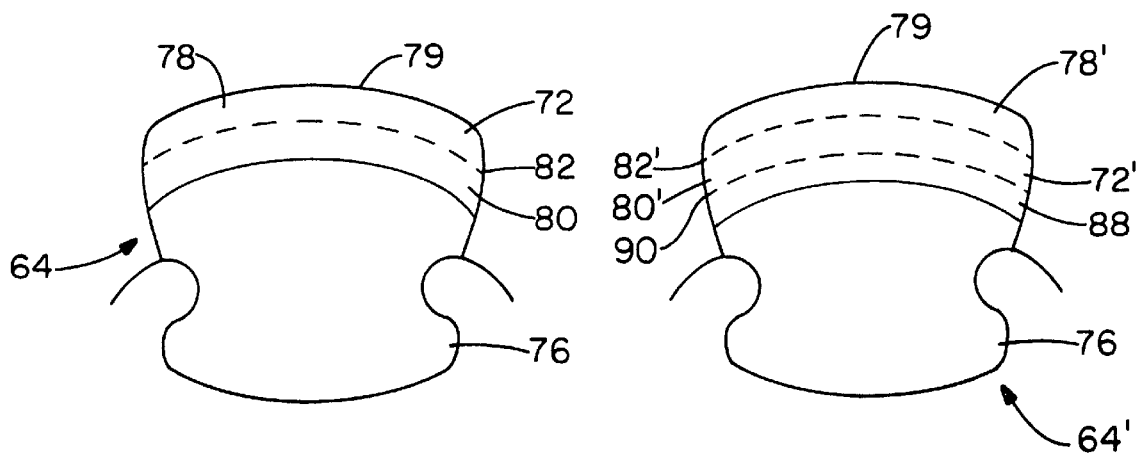
FIG. 11 is a cross-sectional view of one embodiment of a non-pneumatic tire according to the invention; and, FIG. 12 is a cross-sectional view of yet another embodiment of a non-pneumatic tire according to the invention.

Referring now to FIG. 11, a preferred embodiment of a non-pneumatic tire 64 according to the invention is illustrated. The non-pneumatic tire 64 includes a first annular portion 72 and a second annular portion 76. The first annular portion 72 is formed of elastomeric material while the second annular portion 76 is formed of closed-cellular foam material. In the preferred embodiment of the invention, the first annular portion 72 is comprises an outer annular region 78 encompassing the tread surface 79 and an inner annular region 80, separated in the Figure by dashed line 82. For the purposes of the present disclosure, the inner annular region 80 is defined as an "elastomeric hoop", although in the preferred embodiment, there does not exist a well-defined boundary at the interface of the inner annular region 80 and the outer annular region 78.

In the preferred embodiment, the outer annular region 78 exhibits a Shore A hardness of 45–65. Values in this range provide good wet/dry traction. However, if a non-pneumatic tire structure included a foam body with only this type of elastomeric region, unsatisfactory rolling resistance would be achieved. Improvement of the rolling resistance could be achieved by increasing the Shore A hardness of the elastomeric region, but other performance characteristics would then be compromised.

Incorporation of an elastomeric hoop according to the present invention in the form of the inner annular region 80 in the tire structure provides greatly improved performance. In the preferred embodiment, the inner annular region 80 exhibits a Shore A hardness greater than that of the outer annular region 78. A preferred range is 60–80.

In the preferred embodiment, the first annular portion 72 comprises elastomeric material such as would result from the reaction of isocyanate and a polyol mix as well as antioxidants and antiozonants for environmental products to allow for the production of a resistant material.

In the preferred embodiment, the second annular portion 76 comprises a foam material such as would result from the reaction of isocyanate, a polyol mix, and a suitable blowing agent for the creation of the closed-cell foam. Preferably, the foam has a greater than 60% closed cellular structure, and most preferably from 93% to 97% closed cellular structure. Other preferred characteristics of the foam include a density of 20–30 $lb/ft^3$ and a Shore O hardness of 35–55. The position of the second annular portion 76 behind the elastomeric hoop affects the compliance of the tire. In the inventive tire structure, the density and hardness of the foam can be adjusted to modify the compliance of the tire with minimal effect on the rolling resistance. The elastomeric hoop is much stronger than the foam and exhibits a significantly different load/elongation curve.

A preferred method of forming the non-pneumatic tire of the present invention is utilizing a multi-shot process as described earlier. The first annular portion 72 formed in two shots. Thereafter, the foamable material is added as an additional shot. Each of the materials may be chemically bonded by virtue of similar chemical structures during the curing process. Alternately, adhesives may be provided at the interfaces to provide an adhesively bonded structure.

The non-pneumatic tire 64 produced and the method described herein is that of providing an elastomeric portion of the tire 64 which incorporates the functions of a hoop even more uniquely that the belt package of a typical steel belted pneumatic tire. The elastomeric hoop controls the footprint length, width and rolling resistance of the tire 64. Utilizing foam in the second annular portion 76 allows for adjustment of the compliance and weight of the tire without significantly affecting the rolling resistance.

Classical mechanics indicate that a non-pneumatic tire 64 incorporating the internal structure of the present invention exhibits dramatically improved rolling resistance as compared to prior art foam non-pneumatic tires. It is surmised that the effect of the elastomeric hoop on the tire's footprint directly contributes to the improved characteristics.

In a further embodiment of the invention, the radially outward elastomeric portion 72' may include more than two sub-regions. As shown in FIG. 12, in tire 64' there is an outermost annular region 78' encompassing the tread 79, an intermediate annular region 80' exhibiting a greater Shore A hardness and a greater tensile modulus than the first annular region 78', and an innermost annular region 88 whose Shore A hardness and/or tensile modulus differs from those of the intermediate annular region 80'. In the Figure, these three regions are separated by a pair of dashed lines 82', 90. This embodiment encompasses a multiple "hoop" concept. In one embodiment, the Shore A hardness of the innermost region 88 may be less than the Shore A hardness of the intermediate region 80'. The tire structure would thereby "step down" in hardness from near the tread 79 to near the foam 76. Alternately, it may be advantageous to provide an increase in the Shore A hardness from the intermediate region 80' to the innermost region 88 depending on the desired performance characteristics. Any number of sub-regions may be included within the scope of the present invention.

The invention has been described with reference to the preferred embodiment. Obviously, modifications and alterations will occur to others upon a reading and understanding of the specification. It is intended by applicant to include all such modifications and alterations insofar as they come within the scope of the appended claims or the equivalents thereof.

Having thus described the invention, it is now claimed:

1. A non-pneumatic tire for attachment to an associated wheel rim comprising:

a first annular portion including a tread surface;

a second annular portion disposed radially inwardly of said first annular portion, said second annular portion being formed of a second foamed material; and wherein said first annular portion includes an outer annular region formed of a first elastomeric material encompassing said tread surface and an inner annular region formed of a second elastomeric material immediately adjacent thereto, said outer annular region having a Shore A hardness less than a Shore A hardness of said inner annular region.

2. The non-pneumatic tire of claim 1 wherein said Shore A hardness of said outer annular region is 45–65 and said Shore A hardness of said inner annular region is 60–80.

3. The non-pneumatic tire of claim 1 wherein a tensile modulus of said outer annular region is lower than a tensile modulus of said inner annular region.

4. The non-pneumatic tire of claim 1 wherein said inner annular region is chemically bonded to said outer annular region at an interface thereof.

5. The non-pneumatic tire of claim 1 wherein said inner annular region is adhesively bonded to said outer annular region at an interface thereof.

6. The non-pneumatic tire of claim 1 wherein said first annular portion is chemically bonded to said second annular portion.

7. The non-pneumatic tire of claim 1 wherein said first annular portion is adhesively bonded to said second annular portion.

8. The non-pneumatic tire of claim 1 wherein said first annular portion further comprising an intermediate annular region between said inner and outer annular regions.

9. The non-pneumatic tire of claim 8, wherein a hardness of said intermediate annular region is less than a hardness of said inner annular region.

10. The non-pneumatic tire of claim 8 wherein a hardness of said intermediate annular region is greater than said hardness of said inner annular region.

11. A non-pneumatic tire for attachment to an associated rim comprising:

a first annular portion including a tread surface, said first annular portion including an outer annular region formed of a first elastomeric material encompassing said tread surface and an inner annular region formed of a second elastomeric material, said outer annular region exhibiting a Shore A hardness of 45–65 and said inner annular region exhibiting a Shore A hardness of 60–80;

a second annular portion disposed radially inwardly of said first annular portion, said second annular portion being formed of foamed material and exhibiting a Shore O value of 35–55; and wherein said first annular portion has a density of 55–65 lb/ft$^3$.

* * * * *